United States Patent
No et al.

(10) Patent No.: US 10,198,490 B2
(45) Date of Patent: Feb. 5, 2019

(54) SYSTEMS AND METHODS FOR INTERACTIVELY CONFIGURING MULTIPLE CONDITIONS AND MULTIPLE ACTIONS IN A WORKFLOW APPLICATION

(71) Applicant: salesforce.com, inc., San Francisco, CA (US)

(72) Inventors: Jamie No, Lynnwood, WA (US); John Shin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 968 days.

(21) Appl. No.: 14/573,692

(22) Filed: Dec. 17, 2014

(65) Prior Publication Data
US 2015/0193512 A1    Jul. 9, 2015

Related U.S. Application Data

(60) Provisional application No. 61/923,832, filed on Jan. 6, 2014.

(51) Int. Cl.
| | |
|---|---|
| G06F 17/30 | (2006.01) |
| G06F 3/0482 | (2013.01) |
| G06F 3/0484 | (2013.01) |
| G06Q 10/06 | (2012.01) |

(52) U.S. Cl.
CPC ....... G06F 17/30557 (2013.01); G06Q 10/06 (2013.01); Y04S 10/54 (2013.01)

(58) Field of Classification Search
USPC ...................................................... 709/201
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

Primary Examiner — Philip J Chea
Assistant Examiner — Hassan A Khan
(74) Attorney, Agent, or Firm — Lorenz & Kopf, LLP

(57) ABSTRACT

Methods and systems are provided for cascading multiple recipes in a single work flow process. The method includes: providing a database comprising a plurality of object types; providing a graphical user interface (GUI) for display on a computer monitor; prompting the user, using the GUI, to select one of the object types; in response to selecting an object type, prompting the user to define: i) a first recipe comprising first criteria and a first action associated with the first criteria; and ii) a second recipe comprising a second criteria and a second action associated with the second criteria; and automatically executing the work flow process on the selected object type in the database.

18 Claims, 6 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1* | 4/2003 | Mukundan .............. G06F 9/548 719/330 |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186762 A1* | 9/2004 | Beaven .............. G06Q 10/0633 705/7.27 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1* | 4/2005 | Brodersen .............. G06Q 10/06 705/500 |
| 2006/0004749 A1* | 1/2006 | Dettinger ................ G06Q 10/06 |
| 2006/0021019 A1 | 1/2006 | Hinton et al. |
| 2006/0129590 A1* | 6/2006 | Brown .............. G06F 17/30289 |
| 2006/0184492 A1* | 8/2006 | Long ........................ G06N 5/025 706/47 |
| 2007/0174101 A1* | 7/2007 | Li .......................... G06Q 10/06 705/7.26 |
| 2008/0249972 A1 | 10/2008 | Dillon |
| 2008/0288621 A1* | 11/2008 | Snell ...................... G06Q 10/06 709/223 |
| 2009/0063414 A1 | 3/2009 | White et al. |
| 2009/0070783 A1* | 3/2009 | Schmidt ................ G06Q 10/06 719/318 |
| 2009/0100342 A1 | 4/2009 | Jakobson |
| 2009/0172670 A1* | 7/2009 | Bobak ....................... G06F 8/30 718/100 |
| 2009/0177744 A1 | 7/2009 | Marlow et al. |
| 2011/0265020 A1* | 10/2011 | Fields .................... G06Q 10/06 715/760 |
| 2011/0307818 A1* | 12/2011 | Eby ...................... G06Q 10/103 715/769 |
| 2012/0109838 A1* | 5/2012 | Younger .............. G06Q 10/1053 705/321 |
| 2012/0233137 A1 | 9/2012 | Jakobson et al. |
| 2013/0014081 A1* | 1/2013 | Chaar ....................... G06F 8/20 717/109 |
| 2013/0212497 A1 | 8/2013 | Zelenko et al. |
| 2013/0218948 A1 | 8/2013 | Jakobson |
| 2013/0218949 A1 | 8/2013 | Jakobson |

(56) References Cited

U.S. PATENT DOCUMENTS

2013/0218966 A1    8/2013  Jakobson
2014/0122377 A1*  5/2014  Goodman ........ G06Q 10/06311
                                                  706/11
2015/0143258 A1*  5/2015  Carolan ................ G06F 3/0484
                                                  715/752

* cited by examiner

SYSTEMS AND METHODS FOR INTERACTIVELY CONFIGURING MULTIPLE CONDITIONS AND MULTIPLE ACTIONS IN A WORKFLOW APPLICATION

CROSS-REFERENCE TO RELATED APPLICATIONS

This application claims the benefit of U.S. provisional patent application Ser. No. 61/923,832 filed Jan. 6, 2014, the entire contents of which are incorporated herein by this reference.

TECHNICAL FIELD

Embodiments of the subject matter described herein relate generally to computer systems and applications for designing work flow applications, and more particularly to techniques for prompting an administrator to configure multiple workflow conditions and actions for a specified database object type.

BACKGROUND

Workflow application tools or the event-based automation of repetitive tasks are generally well known. For example, IFTTT (available at https://ifttt.com) and Zapier™ (https://zapier.com) provide user configurable background services for automating workflows by connecting a trigger or condition with an action. The IFTTT regime employs an "if this then that" protocol called a recipe in which each channel (e.g., Facebook™, Linkedin™, Twitter™) has its own triggers and actions. Exemplary triggers (the "this" part of a recipe) may include "I'm tagged in a photo on Facebook" or "I checked in on Foursquare." Exemplary actions (the "that" part of a Recipe) may include "send me a text message" or "create a status message on Facebook." Individual data components from a trigger are called ingredients. Exemplary ingredients of an email trigger may include the subject, body, attachment, received date, and the sender's address. After a user configures various recipes for various active channels, the IFTTT service automatically executes the recipes and performs the triggered actions without further user involvement.

In addition, collaborative technologies have changed the way groups of related users (e.g., sales teams) share information about sales opportunities and support other team members. Presently known enterprise social network platforms such as Chatter™, released in June 2010 by Salesforce™ and available at www.salesforce.com, provide users with a feed-based stream of tracked objects such as sales goals, badges, and coaching.

At the same time, software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation within tenant organizations without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Presently known workflow automation tools are adept at implementing simple if/then statements, but are not well suited for more complex recipes. Specifically, presently known tools cannot evaluate compound conditions, execute multiple actions, or cascade recipes within a single work flow process. Work flow automation systems and methods are thus needed which address these shortcomings.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures, and:

DETAILED DESCRIPTION

Embodiments of the subject matter described herein generally relate to systems and methods for configuring a work flow which contemplates multiple compound conditions and actions. As explained in greater detail below, the present disclosure describes an interactive user interface which prompts an organization level administrator to define complex work flow processes, and to apply the processes to an existing relational database structure.

Figure 1:
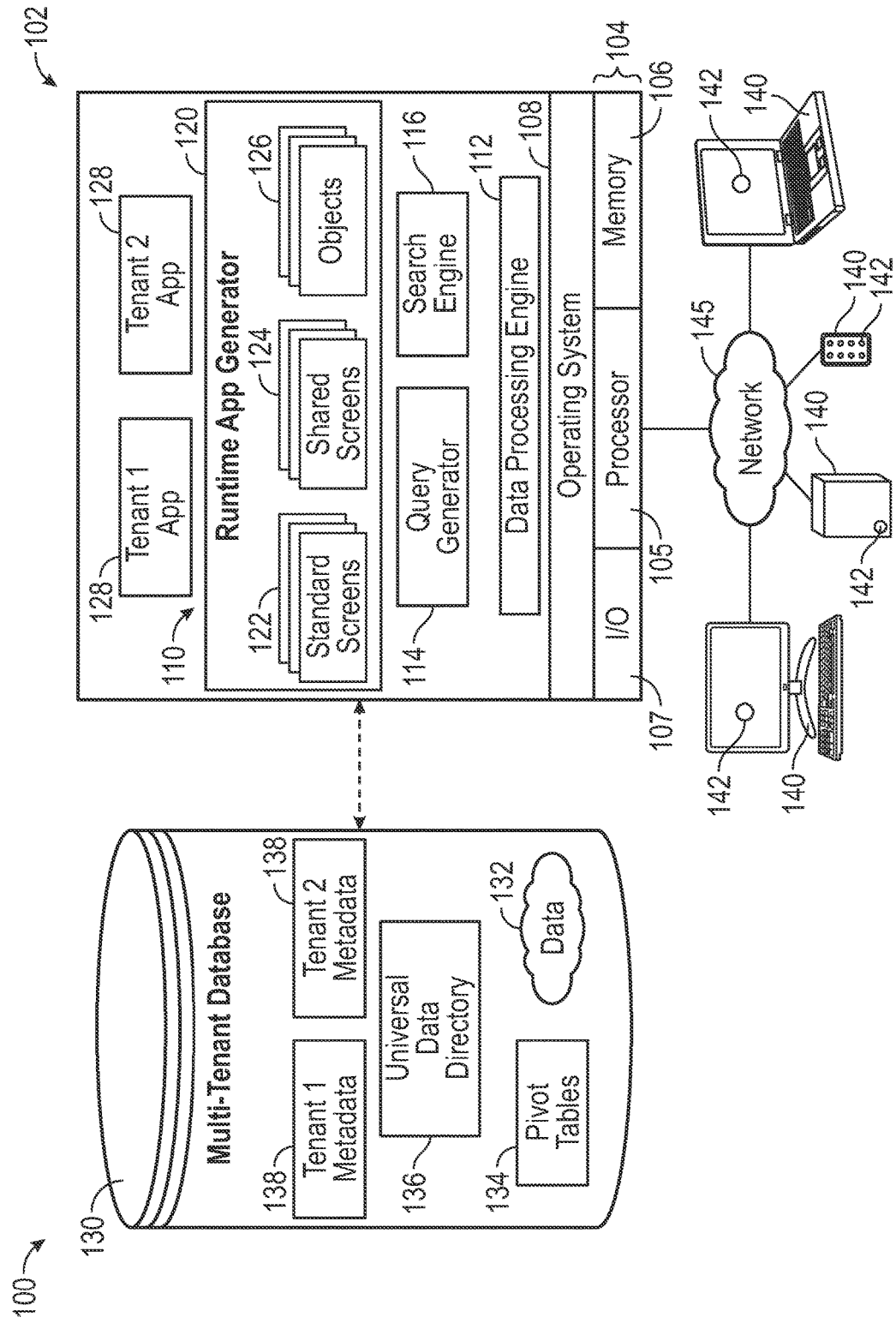
FIG. 1 is a schematic block diagram of a multi-tenant computing environment in accordance with an embodiment.

Turning now to FIG. 1, an exemplary cloud based performance summary solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of client devices 140, such as desk tops, laptops, tablets, smartphones, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the service cloud 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128. In various embodiments, application 128 may embody the functionality of an interactive process builder application linked to a database of objects, as described below in connection with FIGS. 2-9.

In various embodiments, the work flow configuration application works with a companion database including a plurality of tracked data objects. The data object type may comprise any metric or other data relevant to an organization including, without limitation, an account, opportunity, contact, job application, goal, performance metric, or the like. The work flow configuration process may begin by identifying an object type for which conditions and actions are to be defined. In the illustrated example, the object type is a job application.

By way of non-limiting example, an illustrative use case for a work flow may involve managing sales territories within a sales organization. In particular, a sales agent may enter a lead (e.g., in the form of a tracked opportunity object) into a customer relationship management (CRM) database for a potential $1M order from a customer located in Singapore. By configuring a first trigger corresponding to the location of the lead (Singapore), the work flow application can define an associated action to include routing the lead to sales managers located in Asia. By configuring a second trigger corresponding to the value of the lead satisfying a threshold value (e.g., $1M), the work flow application can further define an associated action to include routing the lead only to sales managers located in Asia who are also senior vice presidents of sales. By constructing a work flow process in this manner, all $1M leads from Singapore will automatically be routed to senior sales reps located in Asia, avoiding the otherwise repetitive manual routing activities.

More generally, once the subject 'process builder' tool is configured and deployed, it algorithmically 'crawls' through any existing database and interrogates fields (variables) within objects/records to detect conditions, evaluates their truthiness, and executes the defined actions within an organization.

Figure 2:
FIGS. 2-5 are exemplary screen shots of an interactive user interface for configuring a workflow process in accordance with various embodiments.

Referring now to FIG. 2, a screen shot 200 illustrates an interactive prompt from a process builder application to add a trigger to a work flow for the job application object. More particularly, the screen shot 200 includes an "Add a Trigger" icon 202 which, when selected, displays one or more fields for which conditions or rules associated with the object may be defined. The system prompts the administrator to select from a list of status fields including "currently interviewing", "hire", and "reject." In the illustrated example, the user (administrator) may select the "hire" status condition from the configuration menu 204 by clicking the save button 206. By doing so, the administrator defines a first condition associated with the job application object. It remains to determine additional conditions (if any) and associated actions, as described in greater detail below.

Figure 3:
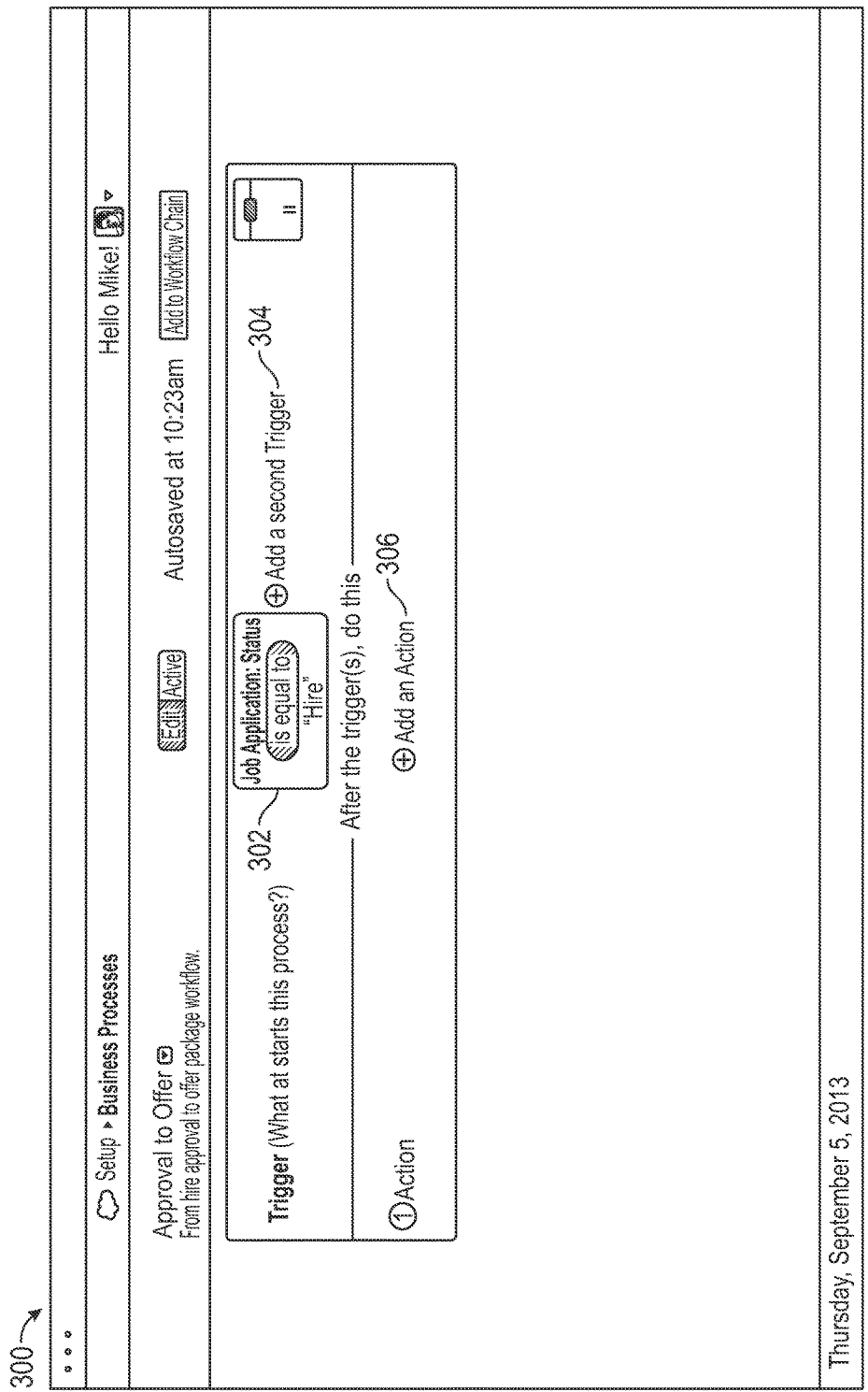

FIG. 3 is a screen shot 300 including a first field 302 confirming the previously defined trigger for the job application object status corresponding to "hire," a second field 304 prompting the user to add a second trigger, and a third field 306 prompting the user to add an action for the trigger 302. In the illustrated example, the user declines the opportunity to add a second trigger, and instead elects to define an action for the current trigger.

Figure 4:

FIG. 4 is a screen shot 400 illustrating various prompts associated with configuring an action. In particular, screen shot 400 includes a first field 402 which prompts the user to select between configuring a new action and editing an existing action, and a second field 404 which prompts the user to select an action from a drop down menu. In the illustrated example, the user selects the "Trigger an approval" action.

With continued reference to FIG. 4, screen shot 400 further includes a naming field 406 and one or more additional configuration fields 408 to further define the action such as, for example, by identifying the individuals or groups who must approve the hire.

Figure 5:
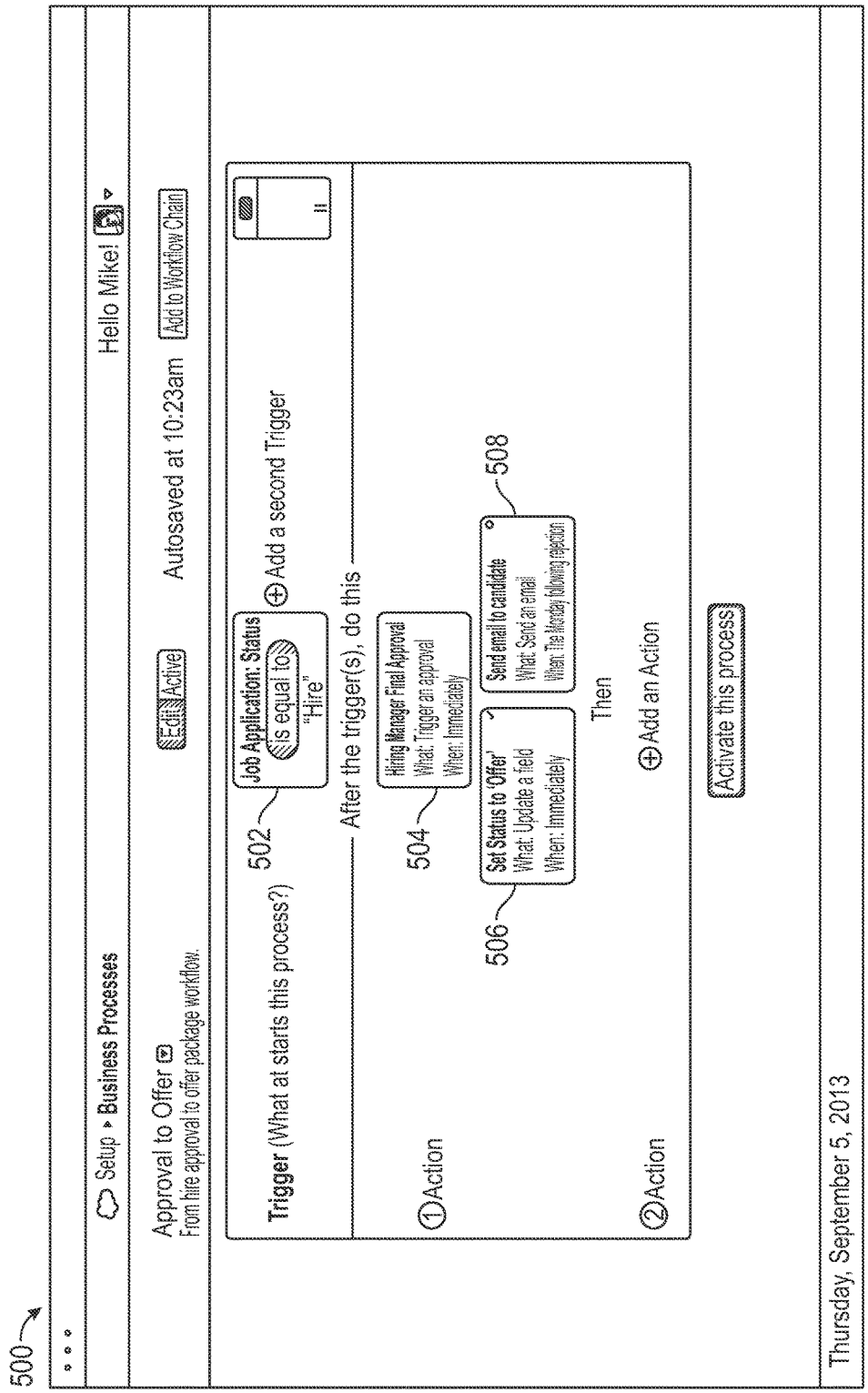

FIG. 5 is a screen shot 500 setting forth the current status of the work flow configuration process, including a job application status equals "hire" condition 502, and three corresponding actions: i) hiring manager final approval 504; ii) set status to 'offer' 506; and iii) send email to candidate 508. Note that these actions have been previously configured, for example, with respect to when the approval is needed (immediately), when the status is re-set (immediately), and when the email is to be sent (the following Monday).

Figure 6:
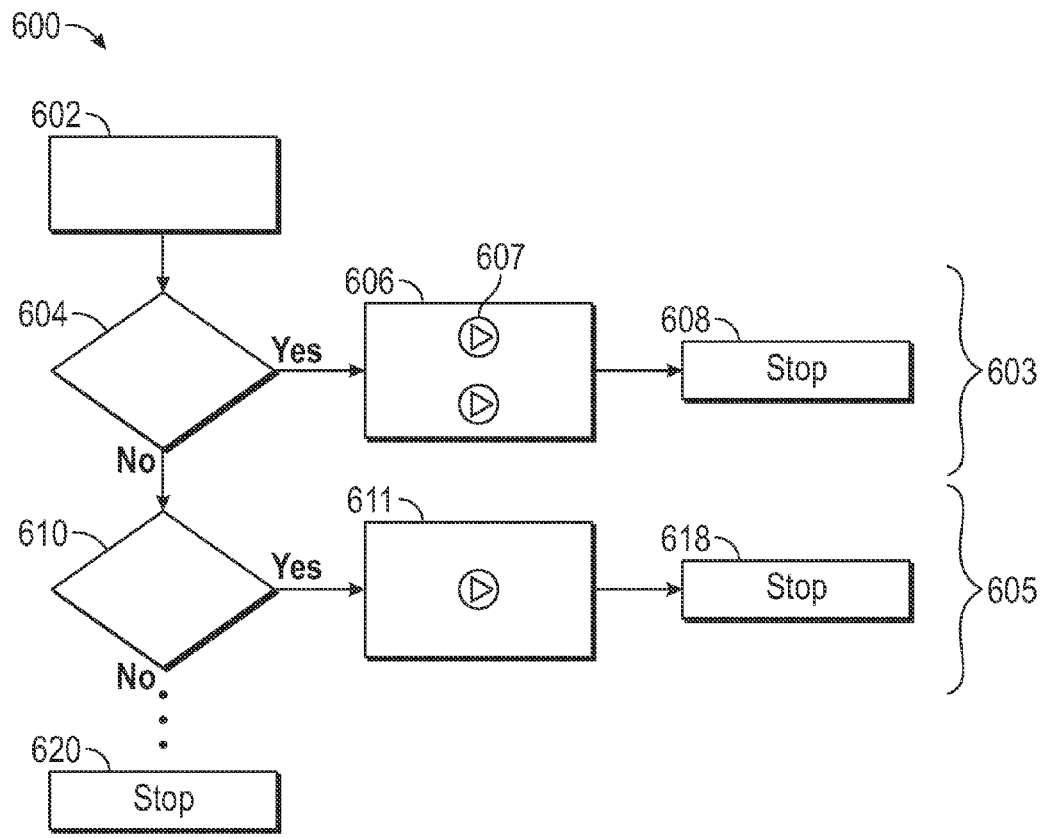
FIG. 6 is a schematic layout of a process architecture for a single work flow which includes cascaded compound recipes in accordance with various embodiments.

FIG. 6 is a schematic layout diagram of a process architecture for a single work flow 600 which includes cascaded, compound recipes in accordance with various embodiments. More particularly, the work flow 600 includes an opening trigger 602 which defines the particular object type to which the work flow applies. That is, while the database being interrogated may contain any number of objects corresponding to any number of object types, in a preferred embodiment each work flow process is dedicated to a single object type. In the example discussed above in conjunction with FIGS. 2-5, the opening trigger defined the object type as "job application."

Work flow 600 further includes a first recipe 603, a second recipe 605 cascaded therewith, and a terminal stop 608. The first recipe 603 includes first criteria 604 and a first actions block 606; the second first recipe 605 includes second criteria 610 and second action(s) 611. It will be appreciated that the criteria may include any number of conditions related to the identified object; however, in a preferred embodiment, all of the conditions within a particular set of criteria must be true in order to proceed to a subsequent recipe within a work flow.

With continued reference to FIG. 6, if all of the criteria 604 conditions are satisfied, the algorithm performs the one or more tasks 607 comprising action block 606, thereby completing the first recipe 603 (stop 608). If, on the other hand, all of the conditions within criteria 604 are not satisfied, the system proceeds to the second recipe 605 and evaluates the truthiness of criteria 610. If all the conditions within criteria 610 are satisfied (true), the system executes the action(s) associated with action block 611, thereby completing the second recipe 605 (stop 618). If criteria 610 are not satisfied, the system nay either execute additional recipes (not shown), or simply terminate (stop 620).

Figure 7:
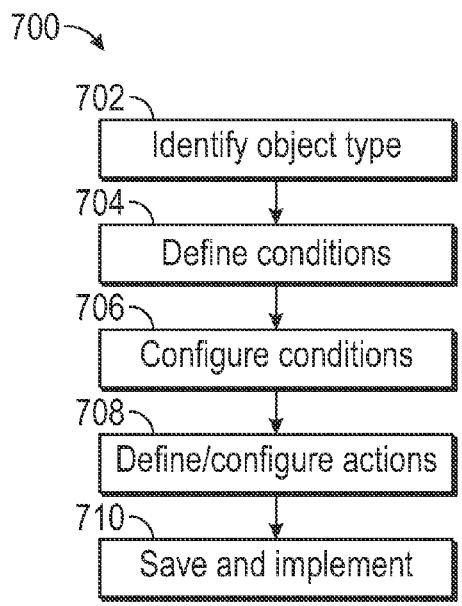
FIG. 7 is a flow chart illustrating an exemplary method of prompting an administrator to configure a work flow process in accordance with various embodiments.

FIG. 7 is a flow chart illustrating an exemplary method 700 of prompting an administrator to configure a work flow process in accordance with various embodiments. More particularly, the method 700 includes prompting the user to define (Task 702) an initial trigger to thereby determine the object type to which the work flow applies. The method then prompts the user to define (Task 704) one or more conditions and configure (Task 706) the conditions. The method 700 further involves defining and configuring (Task 708) one or more actions, and prompting the user to save and implement (Task 710) the completed work flow process.

A method is thus provided for cascading multiple recipes in a single work flow process. The method includes: providing a database comprising a plurality of object types; providing a graphical user interface (GUI) for display on a computer monitor; prompting the user, using the GUI, to select one of the object types; in response to selecting an object type, prompting the user to define: i) a first recipe comprising first criteria and a first action associated with the first criteria; and ii) a second recipe comprising a second criteria and a second action associated with the second criteria; and automatically executing the work flow process on the selected object type in the database.

In an embodiment, the method further includes, in response to defining a first action, prompting the user to define another action associated with the first criteria.

In an embodiment, the method further includes, in response to defining the second action, prompting the user to define another action associated with the second criteria.

In an embodiment, the first criteria comprise a first plurality of conditions, and the second criteria comprise a second plurality of conditions.

In an embodiment, the method further includes processing the second criteria only when all of the first plurality of conditions are not satisfied.

In an embodiment, the method further includes executing the second action only when all of the second plurality of conditions are satisfied.

In an embodiment, the method further includes executing the first action only if all of the first plurality of conditions are satisfied.

In an embodiment, the method further includes prompting the user to define additional criteria and corresponding additional actions associated with the selected object type.

In an embodiment, the object types comprise tracked objects including at least one of: job application, opportunity, performance metric, lead, and contact.

An interactive computer application is also provided for cascading multiple recipes in a single work flow process for use with a database of the type including a plurality of data object types organization. The application may be configured to implement the steps of: prompting a user to select one of the object types; in response to selecting an object type, prompting the user to define: i) a first recipe comprising first criteria and a first action associated with the first criteria; and ii) a second recipe comprising a second criteria and a second action associated with the second criteria; and automatically executing the work flow process on the selected object type in the database.

In an embodiment, the interactive computer application is further configured to prompt the user to define another action associated with the first criteria in response to defining a first action.

In an embodiment, the interactive computer application is further configured to prompt the user to define another action associated with the second criteria in response to defining the second action.

In an embodiment, the first criteria comprises a first plurality of conditions and the second criteria comprises a second plurality of conditions.

In an embodiment, the interactive computer application is further configured to prompt the user to define further sets of criteria and corresponding further actions associated with the selected object type In an embodiment, the interactive computer application is further configured to: process the second plurality of conditions only when all of the first plurality of conditions are not satisfied; execute the third action only when all of the second plurality of conditions are satisfied; and execute the first action only if all of the first plurality of conditions are satisfied.

Machine readable computer code stored in a non-transient medium is also provided for use in a computer system of the type including a database comprising a plurality of object types, a display configured to present an interactive user interface to an a user, an input module configured to receive input from the user, and a processor. The processor may be configured to execute the computer code to implement the steps of: providing a graphical user interface (GUI) for display on a computer monitor; prompting the user, using the GUI, to select one of the object types; in response to defining an object type, prompting the user to define a first plurality of conditions and a first action associated with the first plurality of conditions; and automatically executing the resulting first recipe on the selected object type in the database.

In an embodiment, the machine readable computer is further configured to: prompt the user to define a second action associated with the first plurality of conditions in response to defining a first action; prompt the user to define a second plurality of conditions and a third action associated with the second plurality of conditions; prompt the user to define at least one additional action associated with the second plurality of conditions in response to defining the third action; and automatically execute the resulting second recipe on the selected object type in the database.

In an embodiment, the machine readable computer is further configured to: process the second plurality of conditions only when all of the first plurality of conditions are not satisfied; execute the third action only when all of the second plurality of conditions are satisfied; and execute the first action only if all of the first plurality of conditions are satisfied.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

Other implementations may include a non-transitory computer readable storage medium storing instructions executable by a processor to perform a method as described above.

Yet another implementation may include a system including memory and one or more processors operable to execute instructions, stored in the memory, to perform a method as described above.

The examples illustrating the use of technology disclosed herein through social networking system should not be taken as limiting or preferred. This example sufficiently illustrates the technology disclosed without being overly complicated. It is not intended to illustrate all of the technologies disclosed. For instance, it does not illustrate the use of tagging mechanism in enterprise applications and other personalized applications and with a multi-tenant database with complex and sophisticated architecture.

A person having ordinary skill in the art may appreciate that there are many potential applications for one or more implementations of this disclosure and hence, the implementations disclosed herein are not intended to limit this disclosure in any fashion.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method of cascading multiple recipes in a single work flow process to be automatically executed on a selected object type in a database system that includes a plurality of different objects each comprising a different object type, wherein each object type defines structure a respective object and values for various fields associated with that object type that are maintained as metadata in the database system, the method comprising:
    providing a graphical user interface (GUI) for display on a computer monitor that includes user interface elements for prompting a user to define the work flow process;
    prompting the user, using the GUI, to select one of a plurality of object types that the work flow process is to be defined for and applied to, wherein each object type is associated with a particular object in the database system, wherein each object type defines fields associated with that particular object in the database system;
    in response to selecting the object type that the work flow process is to be defined for and applied to, prompting the user, using the GUI, to define the work flow process to be executed on the selected object type by: i) defining a first recipe comprising first criteria associated with the selected object type and a first action associated with the first criteria, wherein the first criteria comprise a first plurality of conditions; and ii) defining a second recipe comprising second criteria associated with the selected object type and a second action associated with the second criteria, wherein the second criteria comprise a second plurality of conditions; and
    automatically executing, via a computer-based processing system, the work flow process on the selected object type in the database system by:
        interrogating fields of objects in the database system to detect a first subset of objects that have the selected object type and satisfy the first criteria;
        executing the first action with respect to the first subset of objects;
        then interrogating fields of the first subset of objects in the database system to detect a second subset of objects that also satisfy the second criteria; and
        executing the second action with respect to the second subset of objects that satisfy the second criteria.

2. The method of claim 1, further comprising:
in response to defining a first action, prompting the user to define another action associated with the first criteria.

3. The method of claim 1, further comprising:
in response to defining the second action, prompting the user to define another action associated with the second criteria.

4. The method of claim 1, further comprising:
processing the second criteria only when all of the first plurality of conditions are not satisfied.

5. The method of claim 4, further comprising:
executing the second action only when all of the second plurality of conditions are satisfied.

6. The method of claim 4, further comprising:
executing the first action only if all of the first plurality of conditions are satisfied.

7. The method of claim 1, further comprising:
prompting the user, using the GUI, to define additional criteria and corresponding additional actions associated with the selected object type.

8. The method of claim 1, wherein the different objects are accessible by a tenant for integration into an application of an organization, and wherein the object types comprise tracked objects including at least one of: job application, opportunity, performance metric, lead, and contact.

9. An interactive computer application for cascading multiple recipes in a single work flow process to be automatically executed on a selected object type in a database system that includes a plurality of different objects each comprising a different object type, wherein each object type defines structure a respective object and values for various fields associated with that object type that are maintained as metadata in the database system, the application comprising a non-transitory computer readable medium having a computer readable program code embodied therein that when executed by a computer-based processing system is configured to implement the steps of:
    providing a graphical user interface (GUI) for display on a computer monitor that includes user interface elements for prompting a user to define the work flow process; prompting, via the GUI, the user to select one of a plurality of object types that the work flow process is to be defined for and applied to, wherein each object type is associated with a particular object in the database system, wherein each object type defines fields associated with that particular object in the database system;
    in response to selecting the object type that the work flow process is to be defined for and applied to, prompting the user, using the GUI, to define the work flow process to be executed on the selected object type by: i) defining a first recipe comprising first criteria associated with the selected object type and a first action associated with the first criteria, wherein the first criteria comprise a first plurality of conditions; and ii) defining a second recipe comprising second criteria associated with the selected object type and a second action associated with the second criteria, wherein the second criteria comprise a second plurality of conditions; and automatically executing, via the computer-based processing system, the work flow process on the selected object type in the database system by:
interrogating fields of objects in the database system to detect a first subset of objects that have the selected object type and satisfy the first criteria;
executing the first action with respect to the first subset of objects;
then interrogating fields of the first subset of objects in the database system to detect a second subset of objects that also satisfy the second criteria; and
executing the second action with respect to the second subset of objects that satisfy the second criteria.

10. The interactive computer application of claim 9, further configured to:
prompt the user to define another action associated with the first criteria in response to defining a first action.

11. The interactive computer application of claim 10, further configured to:
prompt the user to define another action associated with the second criteria in response to defining the second action.

12. The interactive computer application of claim 10, further configured to:
prompt the user to define further sets of criteria and corresponding further actions associated with the selected object type.

13. The interactive computer application of claim 10, further configured to:
process the second plurality of conditions only when all of the first plurality of conditions are not satisfied;
execute the second action only when all of the second plurality of conditions are satisfied; and
execute the first action only if all of the first plurality of conditions are satisfied.

14. The interactive computer application of claim 9, wherein the different objects are accessible by a tenant for integration into an application of an organization, and wherein the object types comprise tracked objects including at least one of: job application, opportunity, performance metric, lead, and contact.

15. Machine readable computer code stored in a non-transient medium for use in a computer system of the type including a database system that includes a plurality of different objects each comprising a different object type, wherein each object type defines structure a respective object and values for various fields associated with that object type that are maintained as metadata in the database system, a display configured to present an interactive user interface to a user, an input module configured to receive input from the user, and a computer-based processing system configured to execute the computer code to implement the steps of:
providing a graphical user interface (GUI) for display on a computer monitor that includes user interface elements for prompting the user to define a work flow process to be automatically executed on a selected object type in the database system of objects;
prompting the user, using the GUI, to select one of a plurality of object types that the work flow process is to be defined for and applied to, wherein each object type is associated with a particular object in the database system, wherein each object type defines fields associated with that particular object in the database system;
in response to selecting the object type that the work flow process is to be defined for and applied to, prompting the user, using the GUI, to define the work flow process to be executed on the selected object type by: i) defining a first recipe comprising first criteria associated with the selected object type and a first action associated with the first criteria, wherein the first criteria comprise a first plurality of conditions; and ii) defining a second recipe comprising second criteria associated with the selected object type and a second action associated with the second criteria, wherein the second criteria comprise a second plurality of conditions; and automatically executing, via the computer-based processing system, the first recipe on the selected object type in the database system by:
interrogating fields of objects in the database system to detect a first subset of objects that have the selected object type and satisfy the first criteria;
executing the first action with respect to the first subset of objects;
then interrogating fields of the first subset of objects in the database system to detect a second subset of objects that also satisfy the second criteria; and
executing the second action with respect to the second subset of objects that satisfy the second criteria.

16. The machine readable computer code of claim 15, wherein the second action is associated with the first plurality of conditions, wherein the machine readable computer code is further configured to:
prompt the user to define a third action associated with the second plurality of conditions;
prompt the user to define at least one additional action associated with the second plurality of conditions in response to defining the third action; and
automatically execute the second recipe on the selected object type in the database system.

17. The machine readable computer code of claim 16, further configured to:
process the second plurality of conditions only when all of the first plurality of conditions are not satisfied;
execute the third action only when all of the second plurality of conditions are satisfied; and
execute the first action only if all of the first plurality of conditions are satisfied.

18. The machine readable computer code of claim 15, wherein the different objects are accessible by a tenant for integration into an application of an organization, and wherein the object types comprise tracked objects including at least one of: job application, opportunity, performance metric, lead, and contact.

* * * * *